Nov. 12, 1940.                C. O. HUNTER                2,221,190
                        REVERSE LOCK FOR VEHICLES
                           Filed May 8, 1939
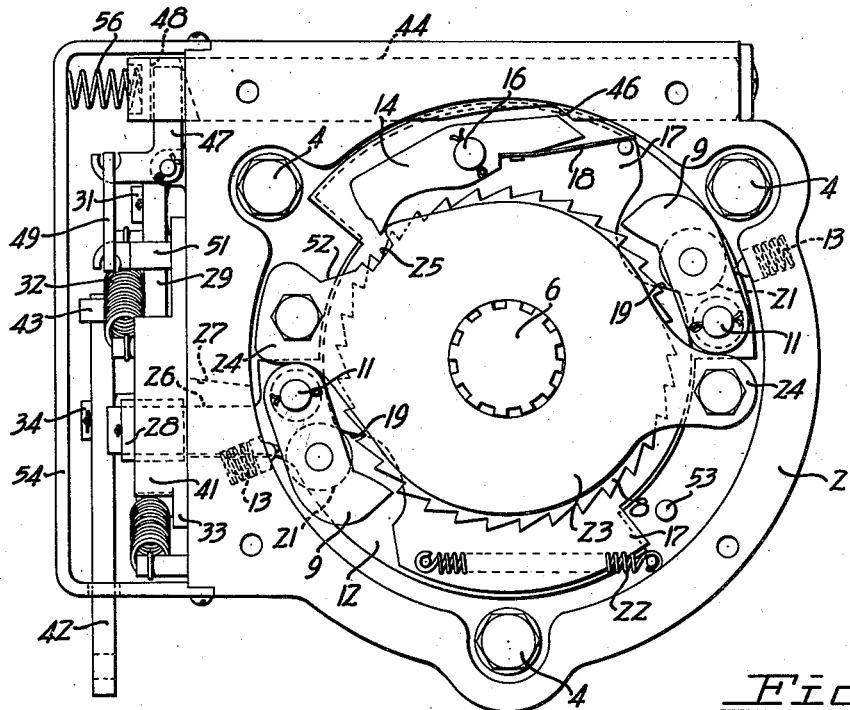
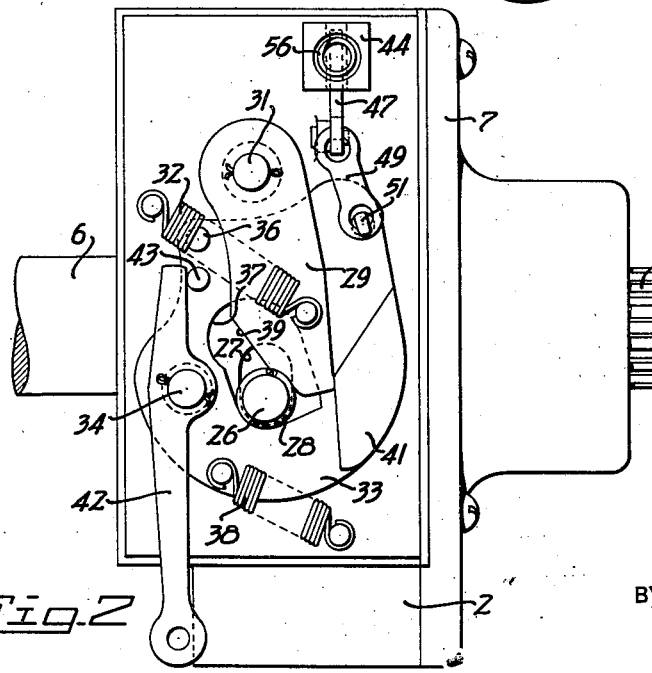
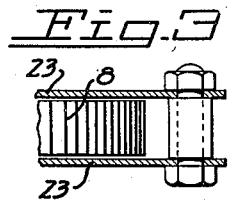
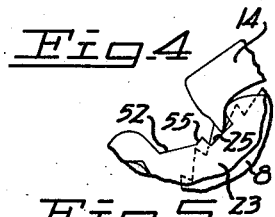
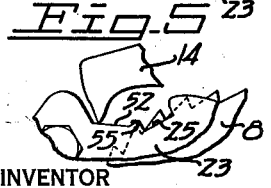
INVENTOR
CHESTER O. HUNTER
BY Charles S. Evans
HIS ATTORNEY Patented Nov. 12, 1940

2,221,190

UNITED STATES PATENT OFFICE 2,221,190

REVERSE LOCK FOR VEHICLES

Chester O. Hunter, San Anselmo, Calif., assignor of one-half to Phillips S. Davies, San Francisco, Calif.

Application May 8, 1939, Serial No. 272,466

8 Claims. (Cl. 188—30)

My invention relates to an automatic locking mechanism for preventing a vehicle, such as an automobile, from moving backward at such times when reverse movement is not desired.

Another object is to provide an improved ratchet and pawl locking mechanism including a pilot pawl for actuating a locking pawl.

A further object is to provide improved means for releasing the locking pawl from engagement with the ratchet wheel.

Still another object is to provide means for disengaging the pilot pawl prior to release of the locking pawl.

A further object is to provide means controlled by the reverse shift lever of the regular transmission for disengaging the pilot pawl and releasing the locking pawl.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a front elevational view of my reverse lock unit with the end plate removed to disclose the ratchet and pawl mechanism; and Figure 2 is a side elevational view of the unit with the cover plate removed to show the pawl release mechanism.

Figure 3 is a fragmentary sectional view showing the cam plates; and

Figures 4 and 5 are detail views showing the pilot pawl in various operative positions.

In terms of broad inclusion, my reverse lock for vehicles comprises a ratchet wheel, a locking pawl engageable with the wheel, and a pilot pawl engageable with the wheel for controlling engagement of the locking pawl. Means responsive to the rotation of the wheel are provided for engaging and disengaging the pilot pawl. Means are also provided for disengaging the locking pawl, and means are provided for disengaging the pilot pawl prior to disengagement of the locking pawl. The latter means are preferably connected for operation by the reverse gear shift of the regular transmission.

In greater detail and referring to the drawing, the reverse lock mechanism embodying my invention comprises a housing 2 mounted on a fixed part or frame of the vehicle. As applied to an ordinary automobile, I prefer to mount the housing directly on the tail end of the transmission gear case by suitable studs 4, so that the stub end of drive shaft 6 projects into the housing. An end plate 7 is provided on the housing, and the splined end of the drive shaft projects through the neck of this plate for connection with the universal joint in the usual manner.

A ratchet wheel 8 is arranged in the housing and is mounted for rotation with a part of the vehicle. In the particular arrangement shown the wheel is splined directly on drive shaft 6, and rotates counterclockwise when the vehicle moves forward and clockwise when the vehicle moves back, as viewed in Figure 1. A pair of locking pawls 9 are mounted within the housing for engagement with the ratchet wheel to lock the vehicle against reverse movement, and are pivoted by pins 11 to an anchor plate 12 oscillatably mounted within the housing about shaft 6. Springs 13 are provided for urging pawls 9 toward locking engagement with the ratchet wheel. In the normal position of the parts anchor plate 12 is held so that pawl pivots 11 are fixed.

A pilot pawl 14 is also provided in the housing for engagement with the ratchet wheel, and is arranged to control engagement of the locking pawls. This pawl is pivoted by a pin 16 on an actuating plate 17 lying in front of anchor plate 12 and oscillatably mounted within the housing about shaft 6. Pawl 14 is urged toward engagement with the ratchet wheel by a leaf spring 18.

Actuating plate 17 has cam surfaces 19 upon which follower rollers 21 of the locking pawls ride; and a spring 22 urges plate 17 toward its counterclockwise limit of rotation to normally hold the locking pawls out of engagement with the ratchet wheel. When pilot pawl 14 engages the ratchet wheel and the latter tends to turn clockwise in accordance with reverse movement of the vehicle, the pilot pawl pivot and connected plate 17 are turned clockwise to allow the locking pawls 9 to ride in on cam surfaces 19 and engage the ratchet wheel. This locks the car against reverse movement. The car is free to go forward at any time however, because the pawls do not interfere with counterclockwise rotation of the ratchet wheel. When the reverse torque exerted on plate 17 by the pilot pawl is released the plate moves ahead again under the influence of spring 22 until the plate lugs 24 abut stops provided by the base ends of pawls 9; thus, the locking pawls are lifted out of engagement to prevent the pawls from clattering on the ratchet teeth.

Pilot pawl 14 is moved into and out of engagement with the ratchet wheel in response to the latter's rotation by cam plate 23 also oscillatably mounted about shaft 6. There are preferably two of these plates, one on each side of the ratchet wheel and held together by suitable pins passing through plate lugs 24, as shown in Figure 3. Plates 23 lie closely adjacent the sides of wheel 8, say with about four-thousandths inch clearance, so that the cam plates frictionally adhere to the ratchet wheel by the oil film between these parts. Thus, when the ratchet wheel rotates in one direction or another, the cam plates 23 are dragged along to the latter's limit of rotation. Aligned notches 25 in the periphery of the cam plates allow the nose of pilot pawl 14 to engage the ratchet wheel when the plates are turned to register the notches with the pawl nose.

As shown in Figure 1, cam plates 23 are turned ahead by counterclockwise rotation of the ratchet wheel when the car moves forward. This lifts the pilot pawl out of engagement with the wheel by the pawl nose riding up on the back side of notch 25, so that the pilot pawl does not clatter on the ratchet teeth. When the ratchet wheel stops, the frictional torque on the cam plates is released. Therefore, immediately upon stopping the car, pilot pawl 14 reengages itself with the wheel by reason of cam plates being free to turn back and allow the spring pressed pilot pawl to ride back down into the notch. The back side of the pawl nose is inclined sufficiently to push the cam plates back under the spring pressure of the pawl. This is an important feature because immediate and positive reengagement of the pilot pawl is insured, and the locking pawls are engaged upon the first slight backward movement of the car. Figure 4 shows the pilot pawl in the notch and engaged with the ratchet wheel.

Since there are times when it is desirable to put the car in reverse gear when my mechanism is locked, means operable by the reverse shift of the regular transmission is provided for disengaging the locking pawls. The release means for the locking pawls includes a lug 26 on plate 12 projecting out the side of the housing through a slot 27 and carrying a roller sleeve 28. Anchor plate 12 is normally held against movement by an abutment link 29 pivoted to the side of the housing on a fixed pin 31 and urged into abutting relation with lug 26 by a spring 32. Link 29 is moved out to release the anchor plate by a platelike arm 33 pivoted on a fixed pin 34 and having a short abutment pin 36 thereon for engaging link 29 to move the latter sideways when arm 33 is rotated clockwise as viewed in Figure 2. Arm 33 has a central opening 37 to clear lug 26, and is urged toward closed position by a spring 38. When the parts are closed a cam surface 39 on link 29 operates to shove lug 26 into locked position, and the link is positively held against opening by an interlocking block 41 on arm 33.

Arm 33 is turned to release the anchor plate by means of a lever 42 pivoted on pin 34 and engaging a pin 43 on arm 33. This lever is connected by a suitable linkage to the gear shift of the regular transmission, so that arm 33 is rotated clockwise whenever the gears are shifted into reverse and rotated back again when the gears are shifted to neutral or to some forward speed. By this arrangement the locking pawls are released whenever the transmission is shifted into reverse gear, thus freeing the ratchet wheel for clockwise rotation to permit the car to go backwards.

Pilot pawl 14 is not designed to carry the backward thrust of the vehicle, this being the job of locking pawls 9; and therefore it is important to insure positive disengagement of the pilot pawl before the locking pawls are disengaged. Means are consequently provided for positively disengaging pilot pawl 14 from the ratchet wheel before the anchor plate is released. This is accomplished by a bar 44 slidable transversely in the housing above pilot pawl 14 and having a cam surface 46 engageable with the rear end of the pilot pawl for disengaging the latter when bar 44 moves to the left.

Cam bar 44 is moved by linkage comprising a bell crank 47 pivoted on the side of the housing and having a leg engaging a slot 48 in the projecting end of the bar. The outwardly extending leg of the bell crank is connected to arm 33 by an apertured link 49 engaging the hooked ends of the bell crank arm and a pin 51 on arm 33. By this arrangement, cam bar 44 slides outwardly when arm 33 turns clockwise as viewed in Figure 2; and the initial outward sliding movement of bar 44 to disengage pilot pawl 14 occurs before pin 36 engages link 29. Therefore, the pilot pawl is positively disengaged before anchor plate 12 is released to disengage the locking pawls.

Another feature of my invention is the provision of means for preventing reengagement of pilot pawl 14 with the ratchet wheel when the operator shifts into neutral or some forward speed while the car is still rolling in reverse. During reverse movement of the car ratchet wheel 8 rotates clockwise, dragging cam plates 23 clockwise to position inclined portions 52 of the cam plates on the opposite side of notch 25 under the nose of pilot pawl 14. Therefore, upon backward movement of bar 44 and release of pilot pawl 14, the latter comes down against cam plate surface 52 and is still held away from the ratchet wheel. See Figure 5. During backward movement of the car, clockwise movement of cam plates 23 is limited by stop pin 53 so that the plates cannot push the pilot pawl back to engage the locking pawls. When the car subsequently comes to a stop, inclined surface 52 causes the cam plates to move ahead under the spring pressure of pilot pawl 14, until the nose of the pilot pawl drops onto flat ledge 55 at the edge of notch 25. This ledge may be made quite narrow, whereby the pilot pawl will drop into notch 25 and reengage the ratchet wheel upon the slightest forward movement of ratchet wheel 8.

A cupped plate 54 is provided for covering the mechanism at the side of the housing, and a spring 56 is preferably interposed between the end of cam bar 44 and the cover plate to urge the cam bar toward the right as viewed in Figure 1. It will be noted that the release mechanism is located at the side of the housing instead of on top. This is done to keep the unit as low as possible, since in modern cars there is very little clearance between the frame and transmission. The locking and pilot pawls are arranged about the side and upper portions of the ratchet wheel to keep the pawls out of the oil in the bottom of the housing, so that operation of the pawls is not affected by the oil becoming heavy in cold climates.

*Operation.*—When the car is going forward, cam plates 23 are turned counterclockwise to hold the pilot pawl out of engagement with ratchet wheel 8 as shown in Figure 1. At this time locking pawls are also disengaged. Whenever the car comes to a stop, the pilot pawl immediately rides down into notch 25 and into engagement with the ratchet teeth as shown in Figure 4. Any subsequent backward movement of the car causes the pilot pawl and connected actuating plate 17 to turn backwards (clockwise) to lower locking pawls 9 into engagement with the ratchet wheel, thus locking the car.

When the transmission gears are shifted into reverse, cam bar 44 moves ahead to disengage the pilot pawl and anchor plate 12 is released to disengage the locking pawls, thus freeing the ratchet wheel for reverse movement of the car. During reverse movement, cam plates 23 are turned clockwise to support the pilot pawl on inclined surface 52 should the pilot pawl be released from bar 44 by shifting into neutral or some forward speed before the car comes to a stop. As soon as the ratchet wheel stops however, pilot pawl 14 rides down onto ledge 55 and is ready to drop into notch 25 and reengage the ratchet wheel upon the slightest forward movement of the wheel.

I claim:

1. A reverse lock for vehicles, comprising a ratchet wheel, a locking pawl engageable with the wheel, a pilot pawl engageable with the wheel for controlling engagement of the locking pawl, means responsive to rotation of the ratchet wheel for permitting movement of the pilot pawl into engagement with said wheel, and means independent of the wheel for disengaging the pilot pawl.

2. A reverse lock for vehicles, comprising a ratchet wheel, a pilot pawl engageable with the wheel and having a movable pivot, a locking pawl engageable with the wheel upon movement of the pilot pawl pivot, means responsive to rotation of the ratchet wheel for permitting movement of the pilot pawl into engagement with said wheel, and means independent of the wheel for disengaging said pilot pawl.

3. A reverse lock for vehicles, comprising a ratchet wheel, a pilot pawl engageable with the wheel and having a movable pivot, a locking pawl also having a movable pivot and engageable with the ratchet wheel upon movement of the pilot pawl pivot, means for holding the locking pawl pivot, means for releasing said latter pivot, and means for disengaging the pilot pawl prior to release of the locking pawl pivot.

4. A reverse lock for vehicles, comprising a ratchet wheel, a movable anchor plate, a locking pawl pivotally mounted on the anchor plate and engageable with the ratchet wheel, means for holding the anchor plate, a pawl actuating plate for moving the locking pawl into engagement with the wheel, a pilot pawl pivotally mounted on the actuating plate and engageable with the wheel for moving said actuating plate, means for releasing the anchor plate, and means for disengaging the pilot pawl prior to release of said anchor plate.

5. A reverse lock for vehicles, comprising a ratchet wheel, a pilot pawl engageable with the wheel and having a movable pivot, a locking pawl also having a movable pivot and engageable with the ratchet wheel upon movement of the pilot pawl pivot, means for holding the locking pawl pivot, means for releasing said latter pivot, a cam for disengaging the pilot pawl, and means for moving the cam.

6. A reverse lock for vehicles comprising a ratchet wheel, a movable anchor plate, a locking pawl pivotally mounted on the anchor plate and engageable with the ratchet wheel, means for holding the anchor plate, a pawl actuating plate for moving the locking pawl into engagement with the wheel, a pilot pawl pivotally mounted on the actuating plate and engageable with the wheel for moving said actuating plate, means for releasing the anchor plate, a cam for disengaging the pilot pawl, and means for moving the cam.

7. A reverse lock for vehicles, comprising a housing, a ratchet wheel journaled in the housing, an anchor plate turnably mounted in the housing and having a lug projecting from said housing, a locking pawl pivotally mounted on the anchor plate and engageable with the ratchet wheel, a pilot pawl pivotally mounted within the housing and engageable with the wheel for moving the locking pawl into engagement with said wheel, means engageable with said lug for holding the anchor plate, a cam movable in the housing for disengaging the pilot pawl, and means for moving said cam and releasing the anchor plate.

8. A reverse lock for vehicles, comprising a housing, a ratchet wheel journaled in the housing, an anchor plate turnably mounted in the housing and having a lug projecting from a side of said housing, a locking pawl pivotally mounted on the anchor plate and engageable with the ratchet wheel, a pilot pawl pivotally mounted within the housing and engageable with the wheel for moving the locking pawl into engagement with said wheel, means adjacent a side of the housing and engageable with said lug for holding the anchor plate, a cam slidable transversely in the housing for disengaging the pilot pawl, and means for moving said cam and releasing the anchor plate.

CHESTER O. HUNTER.